(12) United States Patent
Bielby

(10) Patent No.: US 10,894,545 B2
(45) Date of Patent: Jan. 19, 2021

(54) CONFIGURATION OF A VEHICLE BASED ON COLLECTED USER DATA

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/921,549

(22) Filed: Mar. 14, 2018

(65) Prior Publication Data

US 2019/0283761 A1  Sep. 19, 2019

(51) Int. Cl.
| | |
|---|---|
| *B60W 40/08* | (2012.01) |
| *G06N 20/00* | (2019.01) |
| *G05D 1/00* | (2006.01) |
| *B60W 50/00* | (2006.01) |
| *G06F 8/65* | (2018.01) |
| *G06K 9/00* | (2006.01) |
| *B60W 60/00* | (2020.01) |
| *B60W 50/10* | (2012.01) |
| *B60W 40/09* | (2012.01) |
| *G06N 3/08* | (2006.01) |

(52) U.S. Cl.
CPC ........ *B60W 40/08* (2013.01); *B60W 50/0098* (2013.01); *G05D 1/0088* (2013.01); *G06F 8/65* (2013.01); *G06K 9/00302* (2013.01); *G06K 9/00845* (2013.01); *G06N 20/00* (2019.01); *B60W 2040/0872* (2013.01); *B60W 2050/0079* (2013.01); *B60W 2050/0083* (2013.01); *B60W 2540/21* (2020.02); *B60W 2540/22* (2013.01); *G05D 2201/0213* (2013.01)

(58) Field of Classification Search
USPC .......................................................... 701/23
See application file for complete search history.

(56) References Cited

U.S. PATENT DOCUMENTS

| 8,294,608 B1 | 10/2012 | Lynam |
| 9,517,771 B2 | 12/2016 | Attard et al. |
| 9,817,400 B1 | 11/2017 | Poeppel et al. |

(Continued)

FOREIGN PATENT DOCUMENTS

WO    2007046613    4/2007

OTHER PUBLICATIONS

International Search Report and Written Opinion, PCT/US2018/048390, dated Dec. 14, 2018.

*Primary Examiner* — Aniss Chad
*Assistant Examiner* — Mahmoud M Kazimi
(74) *Attorney, Agent, or Firm* — Greenberg Traurig

(57) ABSTRACT

A vehicle is configured to perform at least one action (e.g., control of acceleration or navigation of the vehicle) based on analysis of data that is collected regarding a user of the vehicle. In one embodiment, the data is collected from various sources (e.g., computing devices associated with the user) prior to usage of the vehicle by the user. For example, data may be collected from an intelligent appliance located in a building or other fixed structure in which the user lives, or in which the vehicle is stored or charged. The data collected from the fixed structure may relate to activities performed by the user while inside the fixed structure and/or relate to data associated with electronic communications of the user.

17 Claims, 7 Drawing Sheets

(56) References Cited

U.S. PATENT DOCUMENTS

| | | | |
|---|---|---|---|
| 9,870,649 B1 | 1/2018 | Fields et al. | |
| 10,144,290 B2* | 12/2018 | Jang | B60W 10/18 |
| 10,303,045 B1 | 5/2019 | Sato | |
| 2006/0208169 A1 | 9/2006 | Breed et al. | |
| 2008/0133716 A1 | 6/2008 | Rao et al. | |
| 2013/0204527 A1 | 8/2013 | Schilling et al. | |
| 2014/0309870 A1 | 10/2014 | Ricci et al. | |
| 2014/0309892 A1* | 10/2014 | Ricci | B60N 2/0244 701/49 |
| 2015/0370272 A1* | 12/2015 | Reddy | G05B 15/02 700/278 |
| 2016/0023665 A1 | 1/2016 | Sherony et al. | |
| 2016/0042401 A1* | 2/2016 | Menendez | G06Q 30/0244 705/14.43 |
| 2016/0070898 A1* | 3/2016 | Kwok-Suzuki | G06F 21/316 726/7 |
| 2016/0104486 A1* | 4/2016 | Penilla | H04L 67/12 704/232 |
| 2017/0097640 A1 | 4/2017 | Wang et al. | |
| 2017/0139411 A1 | 5/2017 | Hartung et al. | |
| 2017/0237944 A1* | 8/2017 | Haas | B60L 53/305 348/143 |
| 2017/0267256 A1 | 9/2017 | Minster et al. | |
| 2017/0309092 A1 | 10/2017 | Rosenbaum | |
| 2018/0096417 A1 | 4/2018 | Cook et al. | |
| 2018/0129202 A1 | 5/2018 | Guo et al. | |
| 2018/0265094 A1 | 9/2018 | Graney | |
| 2018/0275667 A1* | 9/2018 | Liu | G05D 1/0221 |
| 2018/0288605 A1* | 10/2018 | Griffin | H04W 8/18 |
| 2018/0330417 A1 | 11/2018 | Wollmer et al. | |
| 2019/0049981 A1* | 2/2019 | Fischer | B60W 50/10 |
| 2019/0187809 A1 | 6/2019 | Sato | |
| 2019/0197177 A1 | 6/2019 | Bielby | |
| 2019/0258146 A1 | 8/2019 | Sato | |
| 2019/0291719 A1 | 9/2019 | Tiziani | |
| 2019/0371093 A1 | 12/2019 | Edren et al. | |

\* cited by examiner

US 10,894,545 B2

CONFIGURATION OF A VEHICLE BASED ON COLLECTED USER DATA

RELATED APPLICATIONS

This application is related to U.S. Non-Provisional application Ser. No. 15/848,630, filed Dec. 20, 2017, entitled "Control of Display Device for Autonomous Vehicle," by Junichi Sato, the entire contents of which application is incorporated by reference as if fully set forth herein.

FIELD OF THE TECHNOLOGY

At least some embodiments disclosed herein relate to configuration of computing devices for vehicles in general, and more particularly, but not limited to, configuring actions performed by a vehicle based on analysis of data that is collected regarding a user of the vehicle (e.g., an autonomous or other vehicle).

BACKGROUND

A user of a vehicle can be a driver in the case of a manually-driven vehicle. In other cases, such as for an autonomous vehicle, the user of the vehicle typically performs fewer control actions than a "driver" as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway.

A computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves an artificial neural network (ANN) for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where k=1, 2, . . . , n. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where k=1, 2, . . . , n. The activation function may be in the form of a step function, a linear function, a log-sigmoid function, etc. Different neurons in the network may have different activation functions.

Each neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model, a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters.

Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
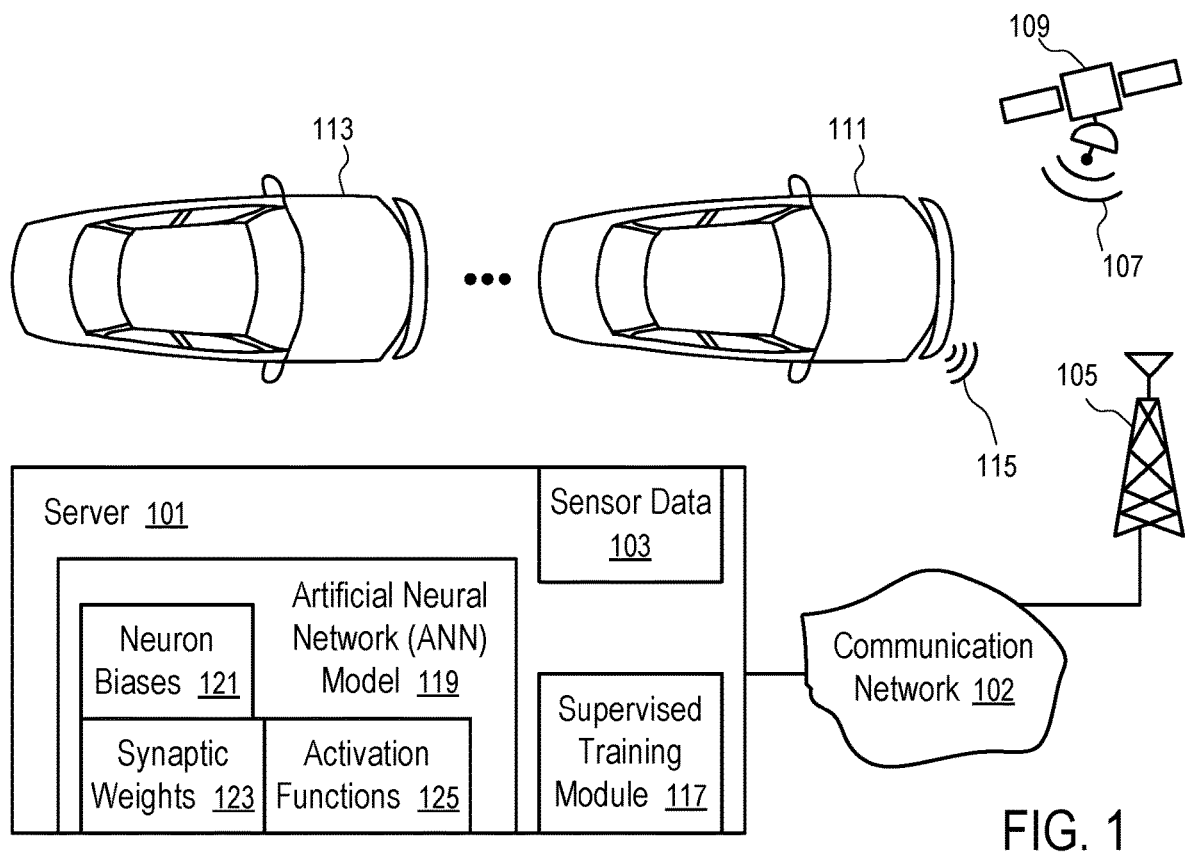
FIG. 1 illustrates a system to configure at least one action of a vehicle based on collected data for a user of the vehicle, according to one embodiment.

At least some embodiments disclosed herein configure a vehicle for a user to perform at least one action (e.g., control of acceleration of the vehicle). The vehicle is, for example, a manually-driven vehicle or an autonomous vehicle. The configuration is based on analysis of data that is collected regarding the user of the vehicle.

In one embodiment, the data is collected from various sources prior to usage of the vehicle by the user. For example, data may be collected from a building or other fixed structure in which the user lives, works, or otherwise is present. The data collected from the fixed structure may relate to activities performed by the user when inside the fixed structure.

In other cases, the data collected from the fixed structure may relate to observations of the user. The collected data may include, for example, audio data collected by a microphone located within the fixed structure and/or image data collected by a camera located within the fixed structure. In other embodiments, alternatively and/or additionally, other types of sensors associated with the fixed structure may be used to collect data associated with the user.

In some embodiments, the vehicle communicates with a computing device of the fixed structure. The vehicle can both receive and send data to the fixed structure. For example, the vehicle can send data that initiates a change in the environment or other function of the fixed structure. In one example, data obtained from the vehicle is used to configure heating provided in a house of the user.

In some embodiments, the collected data may include data collected during usage of the vehicle. In other embodiments, the collected data may include data collected during usage of a different vehicle, for example whether owned by the user or rented.

In various embodiments, the configuration of one or more actions performed by the vehicle may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle. For example, the infotainment system may be configured to provide access to media of the user in a manner related to volume, sequence, etc. as desired by the user based on analysis of the collected data.

In another example, the driving style of the vehicle can be configured to be, for example, aggressive or passive. An aggressive driving style can, for example, include faster acceleration and braking, and more frequent passing of other vehicles on the road.

In some embodiments, the analysis of the collected data includes providing the data as an input to a machine learning model. The vehicle is controlled by performing one or more actions that are based on an output from the machine learning model.

In one example, a machine learning model is trained and/or otherwise used to configure a vehicle to a user (e.g., tailor actions and/or an environment of the vehicle interior).

For example, the machine learning model may be based on pattern matching in which prior patterns of user behavior or other user data is correlated with desired characteristics or configuration(s) for operation of the vehicle. The machine learning model may further use driver inputs during usage of the vehicle to control actions of the vehicle. For example, the driver may input selections into a user interface located in the vehicle.

In some embodiments, the fixed structure is a house in which the user lives. The collected data includes data collected from one or more sensors located in the house and/or from a mobile device of the user (e.g., via a wireless interface of the mobile device). The collected data is analyzed and used to configure a vehicle that the user desires to use. For example, the response and/or actions of the vehicle can be configured based on analysis of the collected data.

In one embodiment, the collected data is analyzed to determine a mood of the user. For example, if the user is in a positive mood, the vehicle can be configured to play more energetic or louder music on an entertainment system of the vehicle. In contrast, if the user is in a negative mood, the vehicle can be configured to play peaceful music at a softer volume level.

Data can be collected from various sources associated with the user. For example, sensors of smart home appliances in the home of the user can be used to collect data. In addition, routine interactions of the user with appliances, a mobile device, and/or other devices can be used to determine a mood of the user.

In some embodiments, voice recognition can be performed to analyze audio data obtained from the user. For example, the audio data can be collected by a microphone of a mobile device of the user and/or a microphone located in a fixed structure which the user is located. In one embodiment, the voice recognition is performed to determine a mood of the user.

In one example, the collected data may include sensor data collected by the vehicle during its real world services when the user is a driver or a passenger. In one embodiment, the collected data is transmitted from the vehicles to a centralized server, which performs machine learning/training, using a supervised method and the collected user data and/or other sensor data, to generate an updated ANN model that can be subsequently loaded into the vehicle to replace its previously-installed ANN model. The model is used to configure the operation of the vehicle for the user.

In some embodiments, the collected data is additionally and/or alternatively collected from a mobile device or other computing device of the user (e.g., text or instant messages sent or received by the user). For example, data obtained from and/or regarding electronic communications associated with the user can be collected and analyzed.

In some embodiments, the data collected from a mobile device or other computing device of the user includes, for example, calendar and/or task information stored on such device. In the case of data obtained from and/or regarding electronic communications associated with the user, the data can relate to a destination of the user. This destination can, for example, be used to configure one or more actions performed by the vehicle that takes the user to the destination.

In one embodiment, data is collected from a wearable computing device. For example, data regarding heart rate or other characteristics of a user can be obtained using the wearable computing device. In other cases, biometric data regarding historical characteristics of the user can be collected (e.g., prior heart rate at certain times or during certain activities).

In another embodiment, the collected data in part includes data collected while the user is driving and/or interacting with the vehicle. For example, collected data may used to detect that a driver level of awareness has fallen below safe levels, such as when the driver is drowsy. In some examples, the vehicle can take over certain operations from the driver. One or more cameras in the vehicle, for example, can be used to collect image data that assist in making this detection. In one example, the vehicle is configured in real-time to respond to the collected user data (e.g., as analyzed in combination with data inputs regarding the user from the vehicle as currently being driven or operated).

In yet other embodiments, the data collected is used to create a profile for the user. In one example, the profile is stored at a cloud server (or other network computing device) and is associated with an account of the user. In another example, the user rents a vehicle which is configured for use by the user based on the profile stored at the cloud server.

In one embodiment, analysis of electronic communications associated with a user (e.g., text communications sent by the user) includes natural language processing (NLP). For example, text extracted from the communications can be analyzed to determine a personality type for use in configuring a vehicle. For example, the personality type can be aggressive or passive. In one embodiment, an NLP algorithm can be used to match collected text to a personality type. In one example, NLP semantic analysis is used to identify a sentiment or mood of the user based on the communications.

In other embodiments, an ANN model trained to process input data based on collected data of a user may be used in one of many devices, such as in vehicles having functions for autonomous driving and/or advanced driver assistance system (ADAS), in connected home devices having artificial intelligence (AI) functions, in industry 4.0 devices having AI functions for automation and data exchange in manufacturing, etc. Thus, the techniques discussed herein in connection with configuration of vehicles can also be used with other intelligent devices, such as those for network connected homes, robots, manufacturing, etc.

FIG. 1 illustrates a system to configure at least one action of a vehicle based on collected data for a user of the vehicle, according to one embodiment. The system uses an Artificial Neural Network (ANN) model according to one embodiment. The system of FIG. 1 includes a centralized server 101 in communication with a set of vehicles 111, ..., 113 via a communications network 102. One of the vehicles will be configured for use by the user based on collected data associated with the user.

In one embodiment, data regarding a user of vehicle 111 is collected from sensors located on a fixed structure of the user and/or a mobile device of the user. The collected data may optionally further include data collected from sensors located in vehicle 111 and/or another vehicle, each of which vehicles have been previously used by the user. The collected data is analyzed, for example, using a computer model such as an artificial neural network (ANN) model.

In one embodiment, the collected data is provided as an input to the ANN model. For example, the ANN model can be executed on server 101 and/or vehicle 111. The vehicle 111 is controlled based on at least one output from the ANN model. For example, this control includes performing one or more actions based on the output. These actions can include, for example, control of steering, braking, acceleration, and/or control of other systems of vehicle 111 such as an infotainment system and/or communication device.

In one embodiment, vehicle 111 is an electric vehicle that is charged using a charging device of a fixed structure of the user such as a house in which the user stores the electric vehicle. A computing device associated with the charging device can, for example, wirelessly transmit data collected from the fixed structure and/or charging device to a communications interface of controller or other computing device of vehicle 111. In some cases, data collected from the fixed structure includes data collected by sensors that monitor physical activity of the user inside the fixed structure.

In one embodiment, the server 101 includes a supervised training module 117 to train, generate, and update ANN model 119 that includes neuron biases 121, synaptic weights 123, and activation functions 125 of neurons in a network used for processing collected data of a user and/or sensor data generated in the vehicles 111, ..., 113. One or more of these vehicles can be, for example, previously driven by the user.

Once the ANN model 119 is designed, trained and implemented, e.g., for autonomous driving and/or advanced driver assistance system, the ANN model 119 can be deployed on one or more of vehicles 111, ..., 113 for real world usage by the user.

In various embodiments, the ANN model is trained using collected user data. The training can be performed on a server and/or the vehicle. Configuration for an ANN model as used in a vehicle can be updated based on the training. The training can be performed in some cases while the vehicle is being operated.

Typically, the vehicles 111, ..., 113 have sensors, such as a visible light camera, an infrared camera, a LIDAR, a RADAR, a sonar, and/or a set of peripheral sensors. The sensors of the vehicles 111, ..., 113 generate sensor inputs for the ANN model 119 in autonomous driving and/or advanced driver assistance system to generate operating instructions, such as steering, braking, accelerating, driving, alerts, emergency response, etc.

During the operations of the vehicles 111, ..., 113 in their respective service environments, the vehicles 111, ..., 113 encounter items, such as events or objects, that are captured in the sensor data. The ANN model 119 is used by the vehicles 111, ..., 113 to provide the identifications of the items to facilitate the generation of commands for the operations of the vehicles 111, ..., 113, such as for autonomous driving and/or for advanced driver assistance.

For example, a vehicle 111 may communicate, via a wireless connection 115 to an access point (or base station) 105, with the server 101 to submit the sensor input to enrich the sensor data 103 as an additional dataset for machine learning implemented using the supervised training module 117. The wireless connection 115 may be made via a wireless local area network, a cellular communications network, and/or a communication link 107 to a satellite 109 or a communication balloon. In one example, user data collected from a vehicle can be similarly transmitted to the server.

Optionally, the sensor input stored in the vehicle 111 may be transferred to another computer for uploading to the centralized server 101. For example, the sensor input can be transferred to another computer via a memory device, such as a Universal Serial Bus (USB) drive, and/or via a wired computer connection, a Bluetooth or WiFi connection, a diagnosis tool, etc.

Periodically, the server 101 runs the supervised training module 117 to update the ANN model 119 based on updated collected data regarding the user. The server 101 may use the sensor data 103 enhanced with the sensor inputs from the vehicle 111 based on prior operation by the user and/or from similar vehicles e.g., 113 that are operated in the same geographical region or in geographical regions having similar traffic conditions to generate a customized version of the ANN model 119 for the vehicle 111.

Optionally, the server 101 uses the sensor data 103 enhanced with the sensor inputs from a general population of vehicles e.g., 111, 113 to generate an updated version of the ANN model 119.

The updated ANN model 119 can be downloaded to the vehicle of the user e.g., 111 via the communications network 102, the access point (or base station) 105, and communication links 115 and/or 117 as an over-the-air update of the firmware/software of the vehicles e.g., 111.

Optionally, the vehicle 111 has a self-learning capability. After an extended period on the road, the vehicle 111 may generate a new set of synaptic weights 123, neuron biases 121, activation functions 125, and/or neuron connectivity for the ANN model 119 installed in the vehicle 111 using the sensor inputs it collected and stored in the vehicle 111. As an example, the centralized server 101 may be operated by a factory, a producer or maker of the vehicles 111, . . . , 113, or a vendor of the autonomous driving and/or advanced driver assistance system for vehicles 111, . . . , 113.

Figure 2:
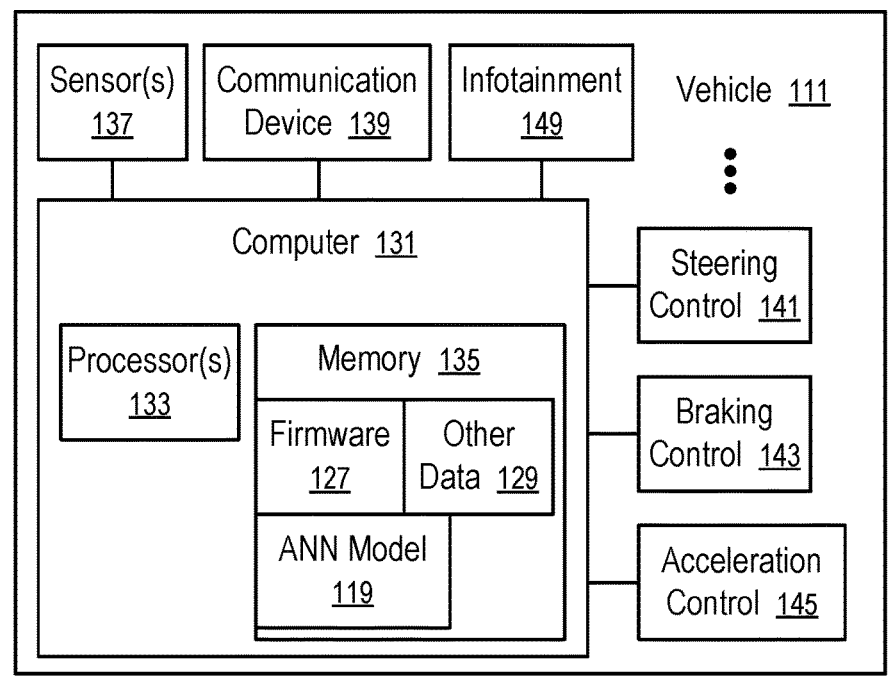
FIG. 2 shows an example of a vehicle configured using an Artificial Neural Network (ANN) model trained using collected data for a user of the vehicle, according to one embodiment.

FIG. 2 shows a vehicle that is configured using an Artificial Neural Network (ANN) model trained using data that is collected for a user of the vehicle, according to one embodiment. The vehicle 111 of FIG. 2 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, the ANN model 119 (e.g., as illustrated in FIG. 1), and other data 129.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip.

The identification or classification of the event or object generated by the ANN model 119 can be used by an autonomous driving module of the firmware (or software) 127, or an advanced driver assistance system, to generate a response. The response may be a command to activate and/or adjust one of the vehicle controls 141, 143, and 145. In one embodiment, the generated response is an action performed by the vehicle where the action has been configured based on analyzing collected data of the user. Prior to generating the response, the vehicle the user is configured. In one embodiment, the configuration of the vehicle is performed by updating firmware of vehicle 111 based on collected user data. In one embodiment, the configuration of the vehicle includes updating of the computer model stored in vehicle 111 e.g., ANN model 119.

The server 101 stores the received sensor input as part of the sensor data 103 for the subsequent further training or updating of the ANN model 119 using the supervised training module 117.

When an updated version of the ANN model 119 is available in the server 101, the vehicle 111 may use the communication device 139 to download the updated ANN model 119 for installation in the memory 135 and/or for the replacement of the previously installed ANN model 119.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving or provision of advanced driver assistance.

Typically, when the ANN model is generated, at least a portion of the synaptic weights 123 of some of the neurons in the network is updated. The update may also adjust some neuron biases 121 and/or change the activation functions 125 of some neurons. In some instances, additional neurons may be added in the network. In other instances, some neurons may be removed from the network.

In one example, data obtained from a sensor may be an image or video that captures an event and/or an object using a camera that images using lights visible to human eyes, or a camera that images using infrared lights, or a sonar, radar, or LIDAR system. In one embodiment, audio data and/or image data obtained from at least one sensor of vehicle 111 is part of the collected user data that was analyzed. In some instances, the ANN model is configured for a particular vehicle 111 based on the sensor and other collected data.

Figure 3:
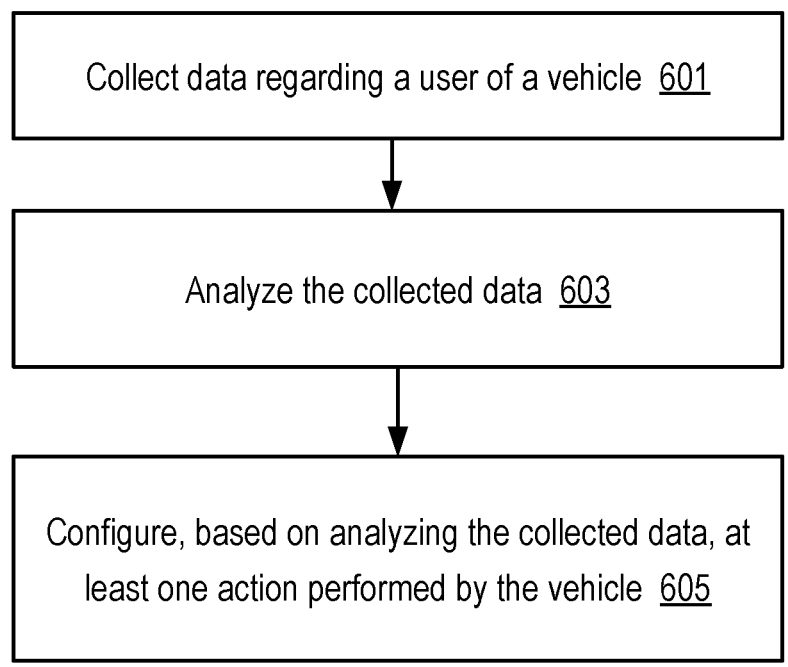
FIG. 3 shows a method to configure at least one action performed by a vehicle based on collected data of a user, according to one embodiment.

FIG. 3 shows a method to configure at least one action performed by a vehicle based on collected data of a user, according to one embodiment. In block 601, data is collected regarding a user of a vehicle (e.g., vehicle 111). In block 603, the collected data is analyzed (e.g., using an ANN model). In block 605, at least one action performed by a vehicle (e.g., driving control or control of infotainment system 149) is configured based on analyzing the collected data.

In one embodiment, a method comprises collecting, by at least one processor, data regarding a user of a vehicle; analyzing, by the at least one processor, the collected data; and configuring, based on analyzing the collected data, at least one action performed by the vehicle.

In one embodiment, the method further comprises performing voice recognition using audio data associated with the user, wherein analyzing the collected data comprises determining, at least in part based on performing the voice recognition, a mood of the user.

In one embodiment, collecting the data comprises receiving first data from a computing device of a charger used to charge the vehicle.

In one embodiment, the charger is located within a fixed structure, the structure comprises at least one sensor, and the first data is obtained from the at least one sensor prior to configuring the at least one action.

In one embodiment, collecting the data comprises receiving data from an appliance of the user, wherein the appliance is located in a building of the user (e.g., a home of the user in which a vehicle of the user is stored and/or charged).

In one embodiment, the appliance is a security device, a refrigerator, an oven, a camera, or a voice recognition device. In one embodiment, collecting the data comprises collecting data from at least one sensor of a wearable computing device worn by the user.

In one embodiment, the method further comprises training a computer model using at least one of supervised or unsupervised learning, wherein the training is done using training data including at least a portion of the collected data.

In one embodiment, collecting the data comprises receiving image data or audio data from at least one sensor.

In one embodiment, the collected data comprises image data, and analyzing the collected data comprises performing facial recognition on the image data to identify facial features for determining an emotional state of the user. In one embodiment, the collected data comprises biometric data of the user. In one embodiment, collecting the data comprises receiving data from at least one of a motion detector, a camera, an accelerometer, or a microphone.

In one embodiment, the collected data comprises at least one of: data collected by sensors that monitor at least one physical activity of the user inside at least one fixed structure; data associated with electronic communications of the user; data regarding times of day and corresponding actions performed by the user; biometric data of the user; or data regarding input selections made by the user in a user interface of at least one of a vehicle or a computing device.

In one embodiment, analyzing the collected data comprises providing the collected data as an input to a computer model, the method further comprising performing an action based on an output from the computer model.

In one embodiment, the vehicle is an autonomous vehicle comprising a controller, configuring the vehicle comprises updating firmware of the controller, and the updated firmware is stored in a storage device of the autonomous vehicle.

In one embodiment, a non-transitory computer storage medium stores instructions which, when executed on a computing device, cause the computing device to perform a method comprising: collecting data regarding a user of a vehicle, wherein the collected data comprises at least one of data collected by sensors that monitor at least one physical activity of a user, or data associated with electronic communications of the user on a mobile device; analyzing the collected data; and configuring, based on analyzing the collected data, at least one action performed by the vehicle.

Figure 4:
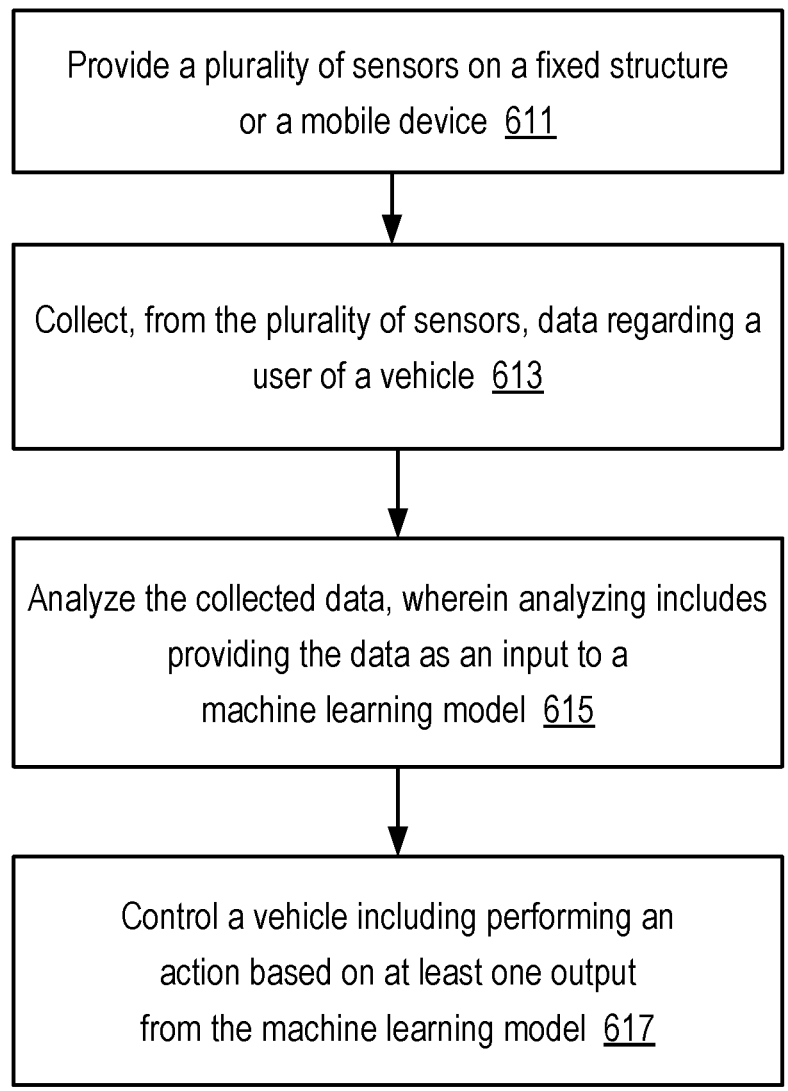
FIG. 4 shows a method to control a vehicle including performing an action based on at least one output from a machine learning model, according to one embodiment.

FIG. 4 shows a method to control a vehicle including performing an action based on at least one output from a machine learning model, according to one embodiment. In block 611, a plurality of sensors are provided on a fixed structure or a mobile device. For example, one or more sensors can be mounted to a wall or other fixture inside the fixed structure. In another example, one or more sensors are incorporated into a mobile device of a user of a vehicle.

In block 613, data is collected from the sensors regarding a user of vehicle. In block 615, the collected data is analyzed. This analysis includes, for example, providing the data as an input to a machine learning model.

In block 617, an action performed by a vehicle is controlled based on at least one output from the machine learning model. For example, the machine learning model is ANN model 119.

In one embodiment, a system includes: a plurality of sensors located on at least one of a fixed structure or a mobile device; at least one processor; and memory storing instructions configured to instruct the at least one processor to: collect, from the plurality of sensors, data regarding a user of a vehicle; analyze the collected data, wherein the analyzing comprises providing the data as an input to a machine learning model; and control a vehicle, wherein the controlling comprises performing an action based on at least one output from the machine learning model.

In one embodiment, the system further includes a communication interface configured to: wirelessly transmit the collected data to a computing device; and receive training data from the computing device; wherein a configuration of the machine learning model is updated using the training data.

In one embodiment, the training data includes data collected, prior to controlling the vehicle, from a charging device used to charge the vehicle.

In one embodiment, the machine learning model is trained using training data, the training data comprising at least one of: data collected by sensors that monitor at least one physical activity of the user inside a fixed structure; or data from electronic communications of the user.

Figure 5:
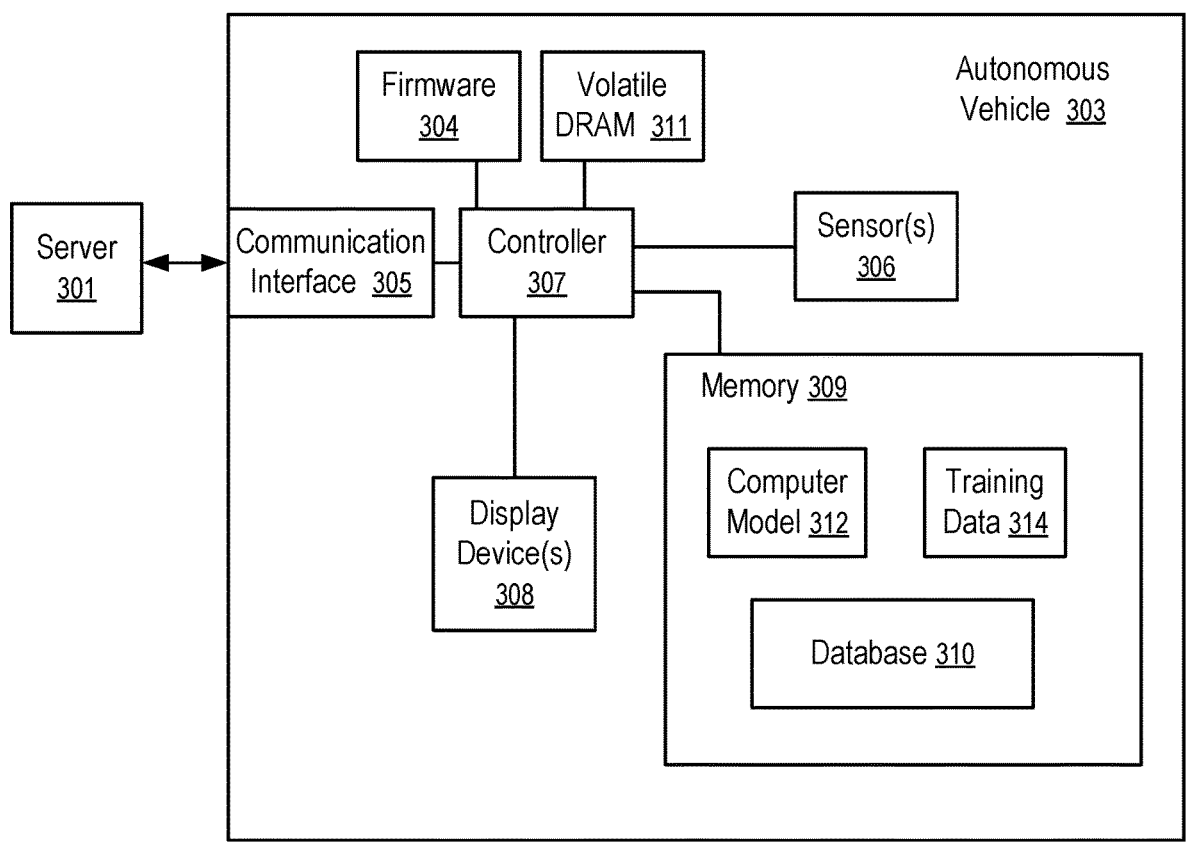
FIG. 5 shows an autonomous vehicle configured based on collected user data and controlled using a computer model, according to one embodiment.

FIG. 5 shows an autonomous vehicle 303 configured based on collected user data and controlled using a computer model, according to one embodiment. At least a portion of the data for a user is collected from the vehicle itself. In one embodiment, a system controls a display device 308 (or other device, system, or component) of an autonomous vehicle 303. For example, a controller 307 controls the display of images on one or more display devices 308.

The controller 307 may receive data collected by one or more sensors 306. The sensors 306 may be, for example, mounted in the autonomous vehicle 303. The sensors 306 may include, for example, a camera, a microphone, a motion detector, and/or a camera. The sensors 306 also may include, for example, sensors incorporated in wearable devices worn by the driver and/or passengers in the autonomous vehicle 303.

The sensors 306 may provide various types of data for collection by the controller 307. For example, the collected data may include image data from the camera and/or audio data from the microphone.

In one embodiment, the image data includes images of one or more faces of the driver and/or passengers (any one person of which can be a future user of vehicle 303 of FIG. 5 and/or a future user of vehicle 111 of FIG. 1). In another embodiment, the collected data includes biometric data for one or more persons in the autonomous vehicle 303. The biometric data may be provided, for example, by a wearable device. In one embodiment, the display device 308 is an electroluminescent display (ELD).

In one embodiment, the controller 307 analyzes the collected data from the sensors 306 (and/or other collected data regarding a user). The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309.

In one embodiment, memory 309 stores a database 310, which may include data collected by sensors 306 and/or data received by a communication interface 305 from computing device, such as, for example, a server 301 (server 301 can be, for example, server 101 of FIG. 1 in some embodiments). In one example, this communication may be used to wirelessly transmit collected data from the sensors 306 to the server 301. The received data may include configuration, training, and other data used to configure control of the display devices 308 by controller 307.

For example, the received data may include data collected from sensors of autonomous vehicles other than autonomous vehicle 303. This data may be included, for example, in training data 314 for training of the computer model 312.

The received data may also be used to update a configuration of a machine learning model stored in memory 309 as computer model 312.

In FIG. 5, firmware 304 controls, for example, the operations of the controller 307 in controlling the display devices 308. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307.

In one embodiment, memory 309 is implemented using various memory/storage technologies, such as NAND gate based flash memory, phase-change memory (PCM), magnetic memory (MRAM), resistive random-access memory, and 3D XPoint, such that the memory 309 is non-volatile and can retain data stored therein without power for days, months, and/or years.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

In one embodiment, the controller 307 performs data intensive, in-memory processing using data and/or instructions organized in memory 309 or otherwise organized in the autonomous vehicle 303. For example, the controller 307 can perform a real-time analysis of a set of data collected and/or stored in the autonomous vehicle 303. In some embodiments, the set of data further includes collected user data obtained from server 301.

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to use the techniques discussed herein for controlling display or other devices of a vehicle as configured based on collected user data.

Figure 6:
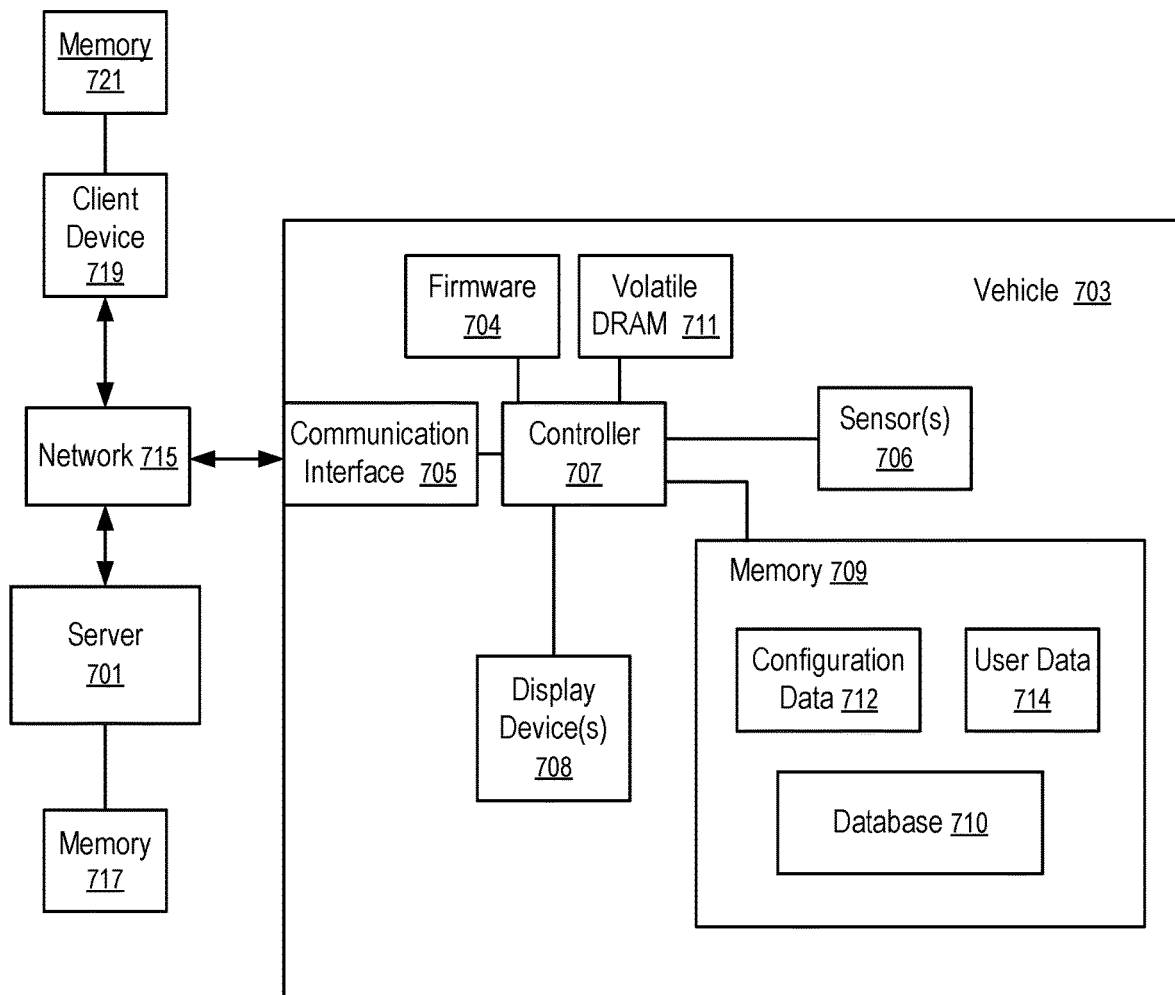
FIG. 6 shows a vehicle configured for a user based on collected data of the user, according to one embodiment.

FIG. 6 shows a vehicle 703 configured for a user based on collected data of the user, according to one embodiment. The vehicle 703 includes a communication interface 705 used to receive a configuration update, which is based on analysis of collected user data. For example, the update can be received from server 701 and/or client device 719. Communication amongst two or more of the vehicle 703, a server 701, and a client device 719 can be performed over a network 715 (e.g., a wireless network). This communication is performed using communication interface 705.

In one embodiment, the server 701 controls the loading of user data (e.g., based on analysis of collected user data) of the new user into the memory 709 of the vehicle. In one embodiment, data associated with usage of vehicle 703 is stored in a memory 721 of client device 719.

A controller 707 controls one or more operations of the vehicle 703. For example, controller 707 controls user data 714 stored in memory 709. Controller 707 also controls loading of updated configuration data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, based on collected user data.

Database 710 can store, for example, configuration data for a user and/or data collected by sensors 706. Database 710 also can store, for example, navigational maps and/or other data provided by the server 701.

In one embodiment, when a vehicle is being operated, data regarding activity of vehicle 703 can be communicated to server 701. This activity may include navigational and/or other operational aspects of the vehicle 703 (e.g., as used by a user for which data is being collected).

As illustrated in FIG. 6, controller 707 also may control the display of images on one or more display devices 708. Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera.

The sensors 706 may provide various types of data for collection by the controller 707. For example, the collected data may include image data from the camera and/or audio data from the microphone.

In one embodiment, the image data includes images of one or more faces of the driver and/or passengers. In another embodiment, the collected data includes biometric data for one or more persons in the vehicle 103. The biometric data may be provided, for example, by a wearable device.

In one embodiment, the controller 707 analyzes the collected data from the sensors 706. The analysis of the collected data includes providing some or all of the collected data to server 701.

In one embodiment, server 701 analyzes collected data associated with a user of vehicle 703. Configuration data is generated based on the analysis and then sent to vehicle 703.

In one embodiment, memory 709 stores database 710, which may include data collected by sensors 706 and/or data received by communication interface 705 from a computing device, such as, for example, server 701. For example, this communication may be used to wirelessly transmit collected data from the sensors 706 to the server 701. The data received by the vehicle may include configuration or other data used to configure control of the display devices 708 by controller 707.

In FIG. 6, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 7:
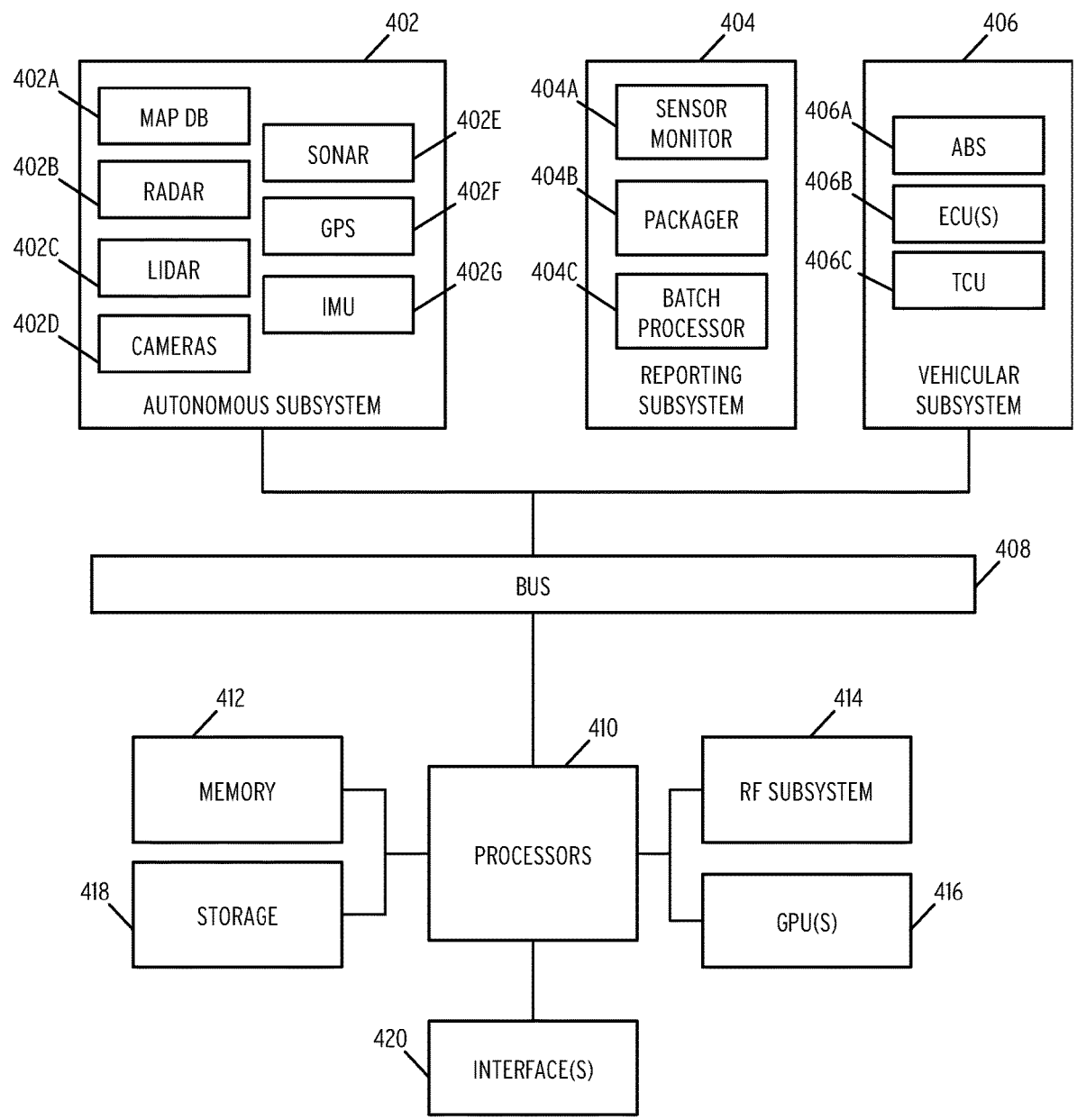
FIG. 7 is a block diagram of an autonomous vehicle including one or more various components and/or subsystems, each of which can be updated in various embodiments to configure the vehicle based on collected user data, according to one embodiment.

FIG. 7 is a block diagram of an autonomous vehicle including one or more various components and/or subsystems, each of which can be updated in various embodiments to configure the vehicle (e.g., using a firmware update) based on collected user data, as was described above. The system illustrated in FIG. 7 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various antilock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 8). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 8:
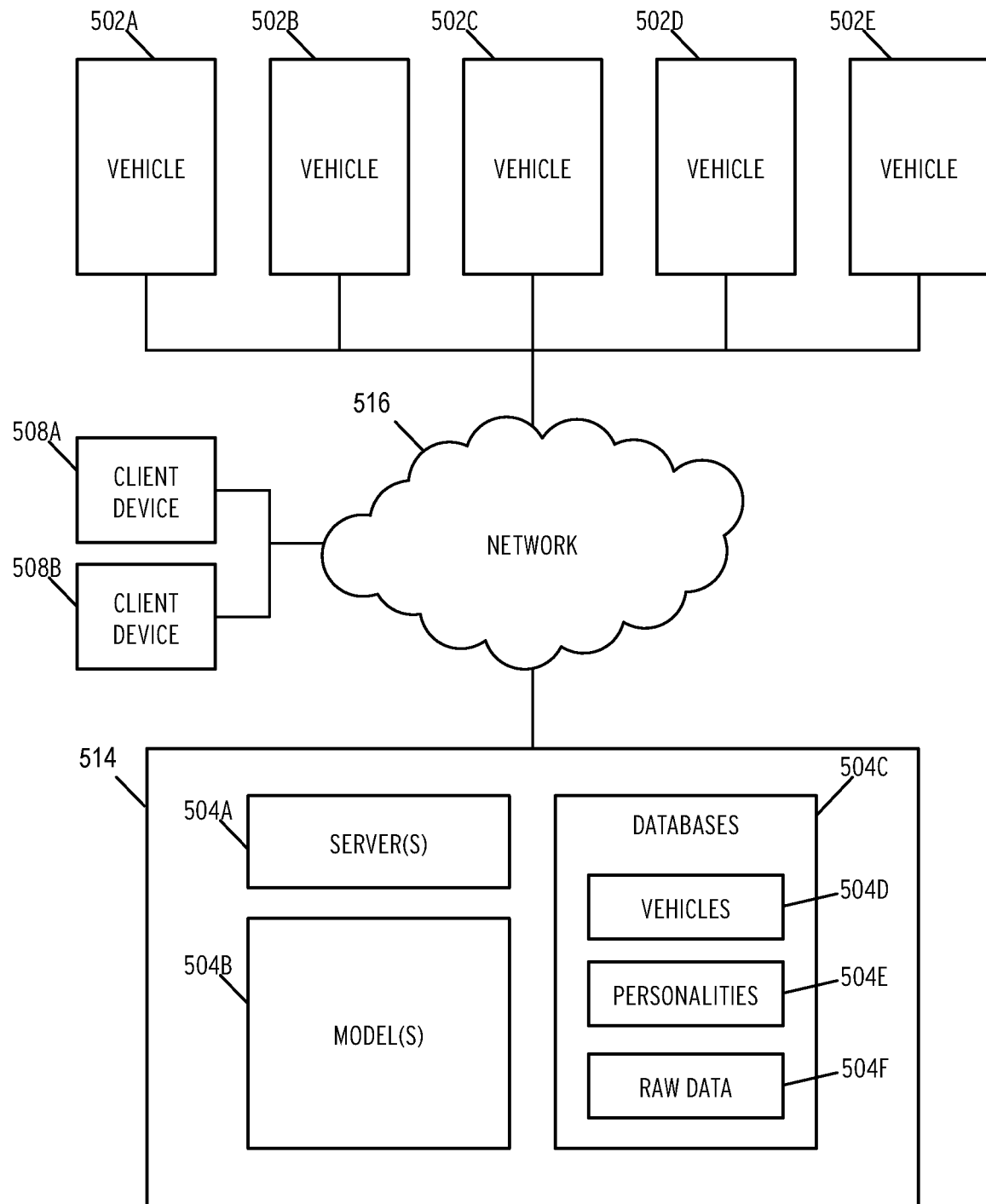
FIG. 8 is a block diagram of a centralized autonomous vehicle operations system, according to various embodiments.

FIG. 8 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 7. Each autonomous vehicle 502A-502E may communicate with a central system 514 via a network 516. In one embodiment, network 516 comprises a global network such as the Internet.

In one example, central system 514 is implemented using one or more of servers 101, 301, and/or 701. In one example, one or more of autonomous vehicles 502A-502E are autonomous vehicle 703.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform these methods, including data processing systems which perform these methods, and computer readable media containing instructions which when executed on data processing systems cause the systems to perform these methods.

Each of the server 101 and the computer 131 of a vehicle 111, . . . , or 113 can be implemented as one or more data processing systems. A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
collecting, by a vehicle using at least one processor, data regarding a user of the vehicle, wherein collecting the data comprises collecting data by at least one sensor mounted on at least one wall of a fixed structure to monitor at least one physical activity of the user, and collecting the data further comprises receiving first data from a computing device of a charging device configured to charge the vehicle, the charging device located within the fixed structure;
training, by the vehicle using a first portion of the collected data regarding the user, a computer model;
analyzing, by the at least one processor using the computer model, a second portion of the collected data regarding the user; and
configuring, based on at least one output from the computer model, a driving style of the vehicle, wherein configuring the driving style comprises updating firmware of a controller that controls acceleration of the vehicle.

2. The method of claim 1, wherein collecting the data regarding the user further comprises collecting audio data, and analyzing the second portion comprises performing voice recognition using the audio data.

3. The method of claim 1, wherein the first portion is collected prior to configuring the driving style.

4. The method of claim 1, wherein collecting the data further comprises receiving data from an appliance of the user, wherein the appliance is located in the fixed structure.

5. The method of claim 4, wherein the appliance is a security device, a refrigerator, an oven, a camera, or a voice recognition device.

6. The method of claim 1, wherein collecting the data further comprises collecting data from at least one sensor of a wearable computing device worn by the user.

7. The method of claim 1, wherein training the computer model is performed using at least one of supervised or unsupervised learning.

8. The method of claim 1, wherein collecting the data further comprises receiving image data or audio data from at least one sensor of the vehicle.

9. The method of claim 1, wherein the collected data regarding the user comprises image data, and analyzing the second portion comprises performing facial recognition on the image data to identify facial features for determining an emotional state of the user.

10. The method of claim 1, wherein the second portion-data comprises data from an accelerometer of the vehicle.

11. The method of claim 1, wherein collecting the data regarding the user further comprises receiving data from at least one of a motion detector, a camera, an accelerometer, or a microphone.

12. The method of claim 1, wherein the collected data regarding the user comprises
data regarding input selections made by the user in a user interface of the vehicle.

13. The method of claim 1, wherein the vehicle is an autonomous vehicle, and the updated firmware is stored in a storage device of the autonomous vehicle.

14. The method of claim 1, wherein the collected data regarding the user further comprises data obtained from at a sensor of a wearable computing device worn by the user.

15. A system comprising:
a controller of a vehicle, the controller configured by firmware to implement a driving style, the driving style including control of acceleration of the vehicle;
at least one sensor located on a charging device configured to charge the vehicle, the charging device located within a fixed structure;
at least one processor; and
memory storing instructions configured to instruct the at least one processor to:
collect data regarding a user of the vehicle, wherein the collected data comprises data collected to monitor at least one physical activity of the user by at least one sensor mounted on at least one wall of the fixed structure, and further comprises data collected by the at least one sensor of the charging device;
train, by the vehicle using a first portion of the collected data regarding the user, a machine learning model;
analyze a second portion of the collected data regarding the user, wherein the analyzing comprises providing the second portion as an input to the machine learning model; and
update, based on at least one output from the machine learning model, the firmware of the controller to change the driving style.

16. The system of claim 15, wherein the second portion comprises
data from electronic communications of the user.

17. A non-transitory computer storage medium storing instructions which, when executed on a computing device, cause the computing device to perform a method comprising:
collecting data regarding a user of a vehicle, wherein the collected data comprises data collected to monitor at least one physical activity of the user by at least one sensor mounted on at least one wall of a fixed structure, and further comprises data collected by at least one sensor of a charging device that monitors at least one physical activity of the user, wherein the charging device is located within the fixed structure and configured to charge the vehicle;
training, by the vehicle using a first portion of the collected data regarding the user, a machine learning model;
analyzing, using the machine learning model, a second portion of the collected data regarding the user; and
configuring, based on analyzing the second portion, a driving style of the vehicle, wherein configuring the driving style comprises updating firmware of a controller that controls acceleration of the vehicle.

\* \* \* \* \*